United States Patent Office 3,428,598
Patented Feb. 18, 1969

3,428,598
POLYURETHANE ELASTOMER COMPOSITIONS
Kanji Matsubayashi and Hiroyuki Segawa, Kurashiki, Japan, assignors to Kurashiki Rayon Co. Ltd., Kurashiki, Japan
No Drawing. Filed Aug. 31, 1966, Ser. No. 576,234
Claims priority, application Japan, Sept. 15, 1965, 40/56,557; Sept. 16, 1965, 40/56,831
U.S. Cl. 260—45.75                5 Claims
Int. Cl. C08g 51/58, 51/04

ABSTRACT OF THE DISCLOSURE

Polyurethane elastomers otherwise subject to yellowing upon exposure to heat and atmospheric gases are stabilized by incorporating therewith from 0.01 to 10% by weight, based upon the elastomer, of a sulfur-containing compound selected from the group consisting of (i)          $CH_3(CH_2)_nS(CH_2)_mOH$ (ii)         $CH_3(CH_2)_nS(CH_2)_mCOOH$ (iii)       $CH_3(CH_2)_mS(CH_2)_mCOO(CH_2)_nCH_3$ (iv) 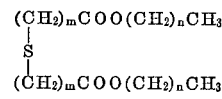

and (v)         $HO(CH_2)_mS(CH_2)_nCOOH_3$ wherein $m$ is an integer of from 1 to 5, and $n$ is an integer of from 6 to 30, and from 0.01 to 10% by weight, based upon the elastomer, of titanium dioxide.

---

This invention is directed to provision of a polyurethane elastomer stabilized against yellowing due to heating and exposure in the air, which comprises a polyurethane elastomer formed by reacting a polyester glycol having hydroxyl radicals on both ends, a diisocyanate, and a low molecular weight diol, blended with at least one compound selected from the group consisting of high aliphatic alcohols containing sulphur atoms, carboxylic acids containing sulphur atoms, carboxylic acid esters containing sulphur atoms in the main chain and mixtures of a phenol derivative and an acid.

It is known that polyurethane elastomers are materially yellowed by heat, light, or by oxidizing components of the air, and the yellowing has presented a serious problem in the application of the elastomers.

For the prevention of yellowing, attempts have hitherto been made to blend polyurethane elastomers with phenol derivatives, amine derivatives or the like which are known as rubber antioxidants, but none of these has satisfactorily solved the problem. Also, it has been proposed to synthesize polyurethane elastomers having good resistance to yellowing by the use of a suitable diisocyanate as a reactive component or of a suitable component as a chain extender of the elastomer. However, most of those components are expensive and inevitably increase the manufacturing cost.

An object of the present invention is to provide polyurethane elastomer compositions stabilized against yellowing due to heating and exposure in the air by blending a polyurethane elastomer composed of polyester having hydroxyl radicals on both ends as a soft segment, a diisocyanate, and a low molecular weight diol as a chain extender with at least one compound selected from the group consisting of higher aliphatic alcohols containing sulphur atoms, carboxylic acids containing sulphur atoms, or carboxylic acid esters containing sulphur atoms, and mixtures of a phenol derivative and an acid. Compounds wherein an aromatic nucleus is directly bonded to a sulphur atom have proved ineffective as compared with the compounds according to the invention.

Another object of the invention is to achieve the effect of remarkably improving the whiteness of polyurethane elastomers by the addition of compounds according to the invention.

Polyurethane elastomers useful in the practice of the invention will be more specifically described hereunder. The polyester glycol for preparing the elastomers has a molecular weight above 500, preferably in the range from 500 to 8,000, and may be a hydroxyl group-terminated polyester obtained by poly-condensation of a dicarboxylic acid such as adipic acid or sebacic acid with an aliphatic glycol such as ethylene glycol, propylene glycol, or butylene glycol, or may be a hydroxyl group-terminated polyester such as poly-caprolactone obtained by ring opening polymerization of lactone.

Organic diisocyanates particularly useful for the invention include naphthylene diisocyanate, 4,4'-diphenylmethane diisocyanate, and phenylene diisocyanate or 2,4-(or 2,6) tolylene diisocyanate. An aliphatic diisocyanate such as hexamethylene diisocyanate may also be employed.

The diol present as a chain extender may be ethylene glycol, propylene glycol, butylene glycol, pentamethylene glycol, diethylene glycol, tetraethylene glycol, or a diol having a benzene nucleus such as 4,4'-diphenylolalkane. Polyurethane elastomers for use in the invention are made by the reaction of these three components.

The compounds containing sulphur atoms which are to be blended with the polyurethane elastomers according to the invention include sulphur-containing higher aliphatic alcohols having the formula $$CH_3(CH_2)_nS(CH_2)_mOH$$

wherein $m$ is an integer of from 1 to 5, and $n$ is an integer of from 6 to 30; sulphur-containing higher aliphatic acids having the formula $$CH_3(CH_2)_nS(CH_2)_mCOOH$$

wherein $m$ is an integer of from 1 to 5, and $n$ is an integer of from 6 to 30; sulphur-containing higher acid esters having the formula $$CH_3(CH_2)_mS(CH_2)_mCOO(CH_2)_nCH_3$$

wherein $m$ is an integer of from 1 to 5, and $n$ is an integer of from 6 to 30; sulphur-containing higher dicarboxylic acid esters having the formula

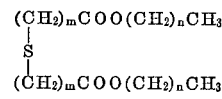

wherein $m$ is an integer of from 1 to 5, and $n$ is an integer of from 6 to 30; and hydroxyl radical and sulphur-containing higher aliphatic acid having the formula $$HO(CH_2)_mS(CH_2)_nCOOH$$

wherein $m$ is an integer of from 1 to 5, and $n$ is an integer of from 6 to 30.

Illustrative examples of suitable sulphur-containing higher aliphatic alcohols which may be employed in the invention are β-(laurylthio-)butyl alcohol,
β-(stearylthio-)butyl alcohol,
β-(caprylylthio-)ethyl alcohol,
β-(caprylthio-)butyl alcohol,
β-(laurylthio-) ethyl alcohol,
β-(pentadecylthio-)propyl alcohol,
β-(cetylthio-)amyl alcohol, β-(stearylthio-)ethyl alcohol,
β-(stearylthio-)propyl alcohol,
β-(stearylthio-)amyl alcohol,
β-(dodecylthio-)propyl alcohol, and
β-(melissylthio-)butyl alcohol.

Illustrative examples of suitable sulphur-containing higher aliphatic acids which may be employed in the invention are β-(laurylthio-)propionic acid,
cetylthioacetic acid,
β-(caprylylthio-)acetic acid,
β-(caprylthio-)butylic acid,
β-(laurylthio-)valeric acid,
β-(stearylthio-)butylic acid,
β-(stearylthio-)valeric acid,
β-(dodecylthio-)acetic acid and
β-(melissylthio-)propionic acid.

Illustrative examples of suitable sulphur-containing higher aliphatic acid esters which may be employed in the invention are propylthiostearyl acetate, ethylthiocapryl acetate, ethylthiocaprylyl propionate, propylthiocapryl acetate, propylthiolauryl acetate, butylthiocetyl butylate, amylthiostearyl acetate, ethylthiododecyl propionate and butylthiomelissyl butyliate.

Illustrative examples of suitable sulphur-containing higher dicarboxylic acid esters which may be employed in the invention are distearyl thiodipropionate, dioctyl thiodipropionate, dicapryl thiodiacetate, dilauryl thiodipropionate, dipentadecyl thiodiacetate, distearyl thiodiacetate, dimelissyl thiodiacetate and dimelissyl thiodibutyliate.

Illustrative examples of suitable hydroxyl radical and sulphur-containing higher aliphatic acids which may be employed in the invention are ω-(β-hydroxyethylthio-)lauric acid,
ω-(β-hydroxypropylthio-)undecanoic acid,
ω-(β-hydroxyethylthio-)caprylic acid,
ω-(β-hydroxybutylthio-)lauric acid,
ω-(β-hydroxypropylthio-)caprylic acid,
ω-(β-hydroxybutylthio-)palmitic acid,
ω-(β-hydroxyethylthio-)stearic acid,
ω-(β-hydroxypentylthio-)stearic acid and
ω-(β-hydroxypropylthio-)melissylic acid.

The amount of each compound ranges from 0.01 to 10% by weight based on the elastomer, preferably from 0.05 to 5% by weight. The effects achievable by the compounds are enhanced by the addition of titanium dioxide, an ultraviolet ray absorbing agent, and other additives.

Phenol derivatives for use in the invention include phenols in which the 2,4,6-positions are replaced by an alkyl radical, for example, 4-methyl-2,6-ditertiary butylphenol, 2,4,6-tritertiary octylphenol, and 2-methyl-4,6-ditertiary amylphenol; halogen-containing phenol derivatives such as 2-methoxy-methyl-5,6-dichlorophenol and 2,6 - dimethoxy-4-methyl-5-chlorophenol; cresol derivatives such as 2,4-diisopropyl-m-cresol or 2,6-dimethylol-p-cresol; and bisphenol derivatives such as 4,4'-butylidene-bis(3-methyl-6-tertiary butylphenol), 2,5-bis(2-hydroxy - 4 - methylbenzyl) - 1,4 - xylene or 2,2-bis(4-hydroxyphenyl)propane.

The amount of each derivative ranges from 0.05 to 10% by weight based on the elastomer, preferably from 0.1 to 5% by weight. The effects achievable by the derivatives are enhanced by the addition of titanium dioxide, an ultraviolet ray absorbing agent, and other derivatives.

The acid compounds suitable for use in combination with phenol derivatives in accordance with the invention are acids, acid anhydrides, halogenated acid derivatives or the like, with an acid ion dissociation constant ranging from $5 \times 10^{-1}$ to $1 \times 10^{-6}$, preferably from $1 \times 10^{-1}$ to $1 \times 10^{-4}$, at 25° C. They include acids such as hydrochloric acid, sulphuric acid, orthophosphoric acid, phosphorous acid, iodic acid, formic acid, acetic acid, monochloroacetic acid or dichloroacetic acid; carboxylic acids such as ortho (or meta) chlorobenzoic acid, oxalic acid, maleic acid or salicylic acid; organic sulfonic acids such as benzenesulfonic acid or paratoluenesulfonic acid; acid anhydrides such as sulphuric acid anhydride, sulphurous acid anhydride, phosphorus pentaoxide or acetic anhydride; and acid chlorides such as thionylchloride, sulfonylchloride or paratoluenesulfochloride.

The acidic ingredient is added in an amount of from 0.01 to 5% by weight, preferably from 0.1 to 2% by weight of the amount of polyurethane elastomer.

The invention is illustrated in the following examples.

Example 1

Hydroxyl radical-terminated polyethylene propylene adipate having a molecular weight of 2,070 (ethylene-propylene copolymerization ratio=9:1), 4,4'-diphenylmethane diisocyanate and ethylene glycol in amounts at a molar ratio of 1.0:5.0:4.0 were allowed to react at 100° C. to obtain a polyurethane elastomer. The elastomer was mixed with 1% by weight of β-(laurylthio-)ethyl alcohol and 2% by weight of titanium dioxide, and the mixture was dissolved in dimethyl formamide to prepare a 20% spinning solution. After defoaming, the solution was spun into a coagulating bath at 35° C. which consisted of water containing 30% dimethyl formamide. Upon washing with water and drying, polyurethane elastomer filament was obtained. For purposes of comparison, filament containing 2% by weight of titanium dioxide but not the additive according to the invention was obtained in the same manner as above described.

Samples of the filaments were heat treated by drying at 120° C. for 24 hours, and other samples of non-heat treated filaments were allowed to stand for 30 days in a place where they were kept from direct sunlight. From the tints of the samples visually observed and from reflection curves of the samples in the range from 300 to 700 mμ on a spectrometer, Yellowing Indices (Y.I.) of the samples were calculated on the basis of the reflectance of 480 mμ and of the formula, Y.I. (Yellowing Index)=70 (1−R1/R2)

(wherein R1 represents reflectance at 455 mμ and R2 represents reflectance at 557 mμ). The Y.I. values thus obtained of the samples with and without the addition of compounds in accordance with the invention were compared. The greater the value of reflectance or less the Y.I. value, the whiter the sample obtained.

TABLE 1

| Compound | Untreated | | | After treatment 120° C. for 24 hours | | | After standing in air for 30 days | | |
|---|---|---|---|---|---|---|---|---|---|
| | Tint visually observed | Reflect. at 480 mμ, percent | Y.I. | Tint visually observed | Reflect. at 480 mμ, percent | Y.I. | Tint visually observed | Reflect. at 480 mμ, percent | Y.I. |
| Titanium dioxide. 2% | White | 74.2 | 3.9 | Light yellow | 53.4 | 13.8 | Yellow | 47.5 | 16.9 |
| β-(laurylthio-)ethyl alcohol, 1.0%; Titanium dioxide, 2%. | do | 89.3 | 1.6 | White | 79.8 | 4.0 | White | 81.2 | 3.8 |

As can be seen from Table 1, the polyurethane elastomer containing no compound according to the invention shows very rapid yellowing when treated with heat or after standing in air for an extended period of time. By contrast, the addition of the compound according to the invention brings outstanding effects in remarkably improving the whiteness of the untreated filament and substantially keeping the product from yellowing by heat treatment and exposure in air for a lengthy period of time.

Example 2

A polyurethane elastomer was obtained by reacting hydroxyl radical-terminated polypropylene adipate having a molecular weight of 1,770, 4,4'-diphenylmethane diisocyanate, and ethylene glycol at a molar ratio of 1.0:4.7:3.6 at 85° C., and 0.5% distearylthiodipropionate and 0.6% dioctylthiodipropionate were added to the elastomer and mixed therewith. The mixture was then injection moulded to a rod-like shape under such conditions that the temperature was 180° C., and the residence time of the polymer was four minutes. As compared with the polymer before moulding the product For purpose of comparison, a mixture containing only 3.0% by weight of titanium dioxide and a mixture containing 3.0% by weight of titanium dioxide and 2.0% by weight of 4,4'-butylidene-bis(3-methyl-6-tertiary butylphenol) were formed into filaments in the same manner as above described.

Samples of the filaments were heat treated at 120° C. for 24 hours, others were irradiated by Fade-O-Meter for 30 hours and others were allowed to stand in air for 30 days in a place where they were kept from direct sunlight. After these treatments, the samples were tested for Y.I. and mechanical properties on the basis of the tints as visually observed and the reflectance indices at 480 m$\mu$ and Y.I. values calculated from the reflectance curves in the range of 300 to 700 m$\mu$ as determined by spectometer. The results are shown in Table 2. Throughout the experiment, the greater the value of reflectance or the less the Y.I. value, the whiter the sample obtained.

TABLE 2

| Treatment | Item determined | Compound | | |
|---|---|---|---|---|
| | | Titanium dioxide, 3.0% | Titanium dioxide, 3.0%; 4,4'-butylidene-bis(3-methyl-6-tert.butylphenol), 2.0% | Titanium dioxide, 3.0%; 4,4'-butylidene-bis(3-methyl-6-tert.butylphenol), 2.0%; Acetic anhydride, 0.5% |
| Untreated | Tint visually observed | White | White | White |
| | Reflect. at 480 m$\mu$ (percent) | 78.5 | 70.2 | 88.6 |
| | Y.I. | 8.8 | 4.1 | 2.1 |
| | Strength (g./d.) | 1.35 | 1.28 | 1.33 |
| | Elongation (percent) | 482 | 408 | 417 |
| After heat treatment at 120° C. for 24 hrs. | Tint visually observed | Light yellow | Light yellow | White |
| | Reflect. at 480 m$\mu$ (percent) | 56.5 | 65.3 | 82.5 |
| | Y.I. | 12.8 | 12.8 | 6.7 |
| | Strength (g./d.) | 0.92 | 1.08 | 1.29 |
| | Elongation (percent) | 312 | 364 | 425 |
| After irrad. with Fade-O-Meter for 30 hrs. | Tint visually observed | Dark yellow | Yellow | White |
| | Reflect. at 480 m$\mu$ (percent) | 35.1 | 47.2 | 78.8 |
| | Y.I. | 36.4 | 29.4 | 7.7 |
| | Strength (g./d.) | 0.51 | 0.77 | 1.17 |
| | Elongation (percent) | 187 | 289 | 496 |
| After exposure in air for 30 days. | Tint visually observed | Yellow | Light yellow | White |
| | Reflect. at 480 m$\mu$ (percent) | 49.2 | 62.5 | 80.0 |
| | Y.I. | 18.5 | 14.8 | 5.6 |
| | Strength (g./d.) | 1.08 | 1.10 | 1.25 |
| | Elongation (percent) | 377 | 379 | 410 | was slightly yellowed. However, a moulding prepared under the same conditions but without the two sulphur-containing esters above mentioned turned yellowish brown, indicating the remarkable effect of the said compounds against yellowing of the melt.

Example 3

Polyethylene propylene adipate having hydroxyl radicals on both ends and a molecular weight of 2,070 (ethylene-propylene copolymerization ratio=9:1), 4,4'-diphenylmethane diisocyanate, and ethylene glycol in amounts at a molar ratio of 1.0:5.0:4.0 were reacted at 100° C. to obtain a polyurethane elastomer. The elastomer was thoroughly mixed with 2.0% by weight of 4,4' - butylidene-bis(3 - methyl - 6 - tertiary butylphenol), 0.5% by weight of acetic anhydride and 3.0% by weight of titanium dioxide. Then the mixture was dissolved in dimethyl formamide to prepare a spinning solution which has a viscosity of 1,150 poises at 40° C. After defoaming under vacuum, the spinning solution was extruded through a spinneret having 10 holes each 0.2 mm. in diameter, into a spinning column and dried therein by hot air at 220° C. The dried product was wound up at a rate of 350 m./min., and thus polyurethane elastomer filament was obtained.

As can be seen from Table 2, the polyurethane composition according to the invention has a high resistance to yellowing and is also highly resistant to deterioration of the mechanical properties of the product.

It can be further seen that the whiteness of the untreated filament can be remarkably improved by the addition of acid.

Example 4

The same polymer as described in Example 3 was dissolved in dimethyl formamide to prepare a 15% solution.

To the solution, 1.0% by weight of 4-methyl-2,6-ditertiary butylphenol and 0.2% by weight of hypophosphorous acid were added, and the mixture was coagulated in water to form a film. For comparison, a mixture containing only 1.0% by weight of 4-methyl-2,6-ditertiary butylphenol, and a mixture containing only 0.2% by weight of hypophosphorous acid, and a mixture containing neither of these additives were formed into films in the same manner as above described. These films were examined for colouring after irradiation by Fade-O-Meter for 30 hours or after exposure in the air in the absence of direct sunlight for 30 days. The results are shown in Table 3.

TABLE 3

| Treatment | No compound | Compound | | |
|---|---|---|---|---|
| | | Hypophosphorous acid, 0.2% | 4-methyl-2,6-ditert. butylphenol, 1.0% | 4-methyl-2,6-ditert. butylphenol, 1.0%; Hypophosphorous acid, 0.2% |
| Untreated | White | White | White | White. |
| After irrad. by Fade-O-Meter for 30 hrs | Dark yellow | Dark yellow | Yellow | Do. |
| After exposure in air for 30 days | Yellow | Yellow | do | Do. |

It is apparent from the above table that 4-methyl-2,6-ditertiary butylphenol and hypophosphorous acid are not effective when used singly but can exhibit a remarkable effect when used in combination.

Example 5

Hydroxyl radical-terminated polybutylene adipate having a molecular weight of 1,950, 4,4'-diphenylmethane diisocyanate and ethylene glycol at a molar ratio of 1.0:4.7:3.8 were reacted at 100° C. to obtain a polyurethane elastomer. The elastomer was blended with 1.5% by weight of 2,5-bis(2 - hydroxy - 4 - methylbenzyl)-1,4-xylene, 0.5% by weight of acetic anhydride and 2.0% by weight of titanium dioxide, and the mixture was dissolved in dimethyl formamide to prepare 18% solution. The solution was then extruded through a spinneret having 100 holes each 0.08 mm. in diameter and was spun into filaments in water at 35° C. containing 30% dimethyl formamide. For purposes of comparison, 1.5% by weight of 2,5-bis(2-hydroxy-4-methylbenzyl) - 1,4 - xylene, 0.5% by weight of acetic acid anhydride and 2.0% by weight of titanium dioxide were blended in a 15% dimethyl formamide solution of a polyurethane elastomer formed of hydroxyl radical-terminated polytetramethylene glycol having a molecular weight of 1,900 as a soft segment, 4,4'-diphenylmethane diisocyanate, and p,p'-methylene dianiline in the same manner as above described. The mixture was wet spun into filaments. The results are shown in Table 4.

In the same way as in Example 3, these two types of filaments containing the compounds according to the invention were tested for colouring on heating, irradiation by Fade-O-Meter, and upon exposure in the air.

As will be clear from Table 4, the use of compounds according to the invention, that is, combined used of 2,5-bis(2-hydroxy-4-methylbenzyl)-1,4-xylene and acetic anhydride, exhibited little effect against yellowing and deterioration upon irradiation by Fade-O-Meter of the polyurethane elastomer in which polyether was as a soft segment.

What we claim is:
1. Polyurethane elastomeric composition, highly stabilized against yellowing, comprising
   (A) polyesterurethane elastomer produced from the reaction of polyester glycol having hydroxyl radicals on both ends and a molecular weight of more than 500, diisocyanate and low molecular weight diol;
   (B) from 0.01 to 10%, based on the weight of said elastomer, of a sulfur-containing compound selected from the group consisting of the compounds represented for the formulae:
      (i) $CH_3(CH_2)_nS(CH_2)_mOH$,
      (ii) $CH_3(CH_2)_nS(CH_2)_mCOOH$,
      (iii) $CH_3(CH_2)_mS(CH_2)_mCOO(CH_2)_nCH_3$,

(iv) 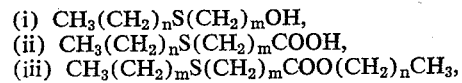

and
      (v) $HO(CH_2)_mS(CH_2)_nCOOH$ wherein $m$ is an integer of from 1 to 5, and $n$ is an integer of from 6 to 30; and
   (C) from 0.01 to 10%, based on the weight of said elastomer, of titanium dioxide.
2. A polyurethane elastomeric composition according to claim 1, wherein the sulfur-containing compound is β-(laurylthio)ethyl alcohol.
3. A polyurethane elastomeric composition according to claim 1, wherein the sulfur-containing compound is β-(laurylthio)propionic acid.
4. A polyurethane elastomeric composition according to claim 1, wherein the sulfur-containing compound is distearyl thiodipropionate.
5. A polyurethane elastomeric composition according to claim 1, wherein the sulfur-containing compound is dioctyl thiodipropionate.

TABLE 4

| Treatment condition | Item determined | Polymer | |
|---|---|---|---|
| | | Polytetramethylene glycol-4,4'-diphenylmethane diisocyanate-p,p'-methylene dianiline | Polybutylene adipate-4,4'-diphenylmethane diisocyanate-ethylene glycol |
| Untreated | Colouring | White | White |
| | Strength (g./d.) | 0.87 | 1.24 |
| | Elongation (percent) | 682 | 895 |
| After heat treatment at 120° C. for 24 hrs | Colouring | Yellow | White |
| | Strength (g./d.) | 0.66 | 1.19 |
| | Elongation (percent) | 650 | 418 |
| After irrad. by Fade-O-Meter for 30 hrs | Colouring | Dark Yellow | White |
| | Strength (g./d.) | 0.13 | 1.07 |
| | Elongation (percent) | 112 | 348 |
| After exposure in air for 30 days | Colouring | Dark Yellow | White |
| | Strength (g./d.) | 0.58 | 1.20 |
| | Elongation (percent) | 518 | 389 |

References Cited

UNITED STATES PATENTS

| 2,915,496 | 12/1959 | Swart et al. | 260—45.7 |
| 3,067,149 | 12/1962 | Dombrow et al. | 260—2.5 |
| 3,072,605 | 1/1963 | Rodgers et al. | 260—45.95 |
| 3,179,625 | 4/1965 | Ehrhart et al. | 260—75 |
| 3,193,525 | 7/1965 | Kallert et al. | 260—45.9 |
| 3,280,049 | 10/1966 | Hyre et al. | 260—2.5 |
| 3,352,822 | 11/1967 | Yamadera et al. | 260—48.85 |

FOREIGN PATENTS 665,356  6/1963  Canada.

DONALD E. CZAJA, Primary Examiner.

V. P. HOKE, Assistant Examiner.

U.S. Cl. X.R.

260—32.6, 45.7, 45.85, 45.95